No. 857,143. PATENTED JUNE 18, 1907.
F. ZAGELMEYER.
FILLING MECHANISM FOR BRICKMAKING PLANTS.
APPLICATION FILED JULY 30, 1906.
2 SHEETS—SHEET 1.
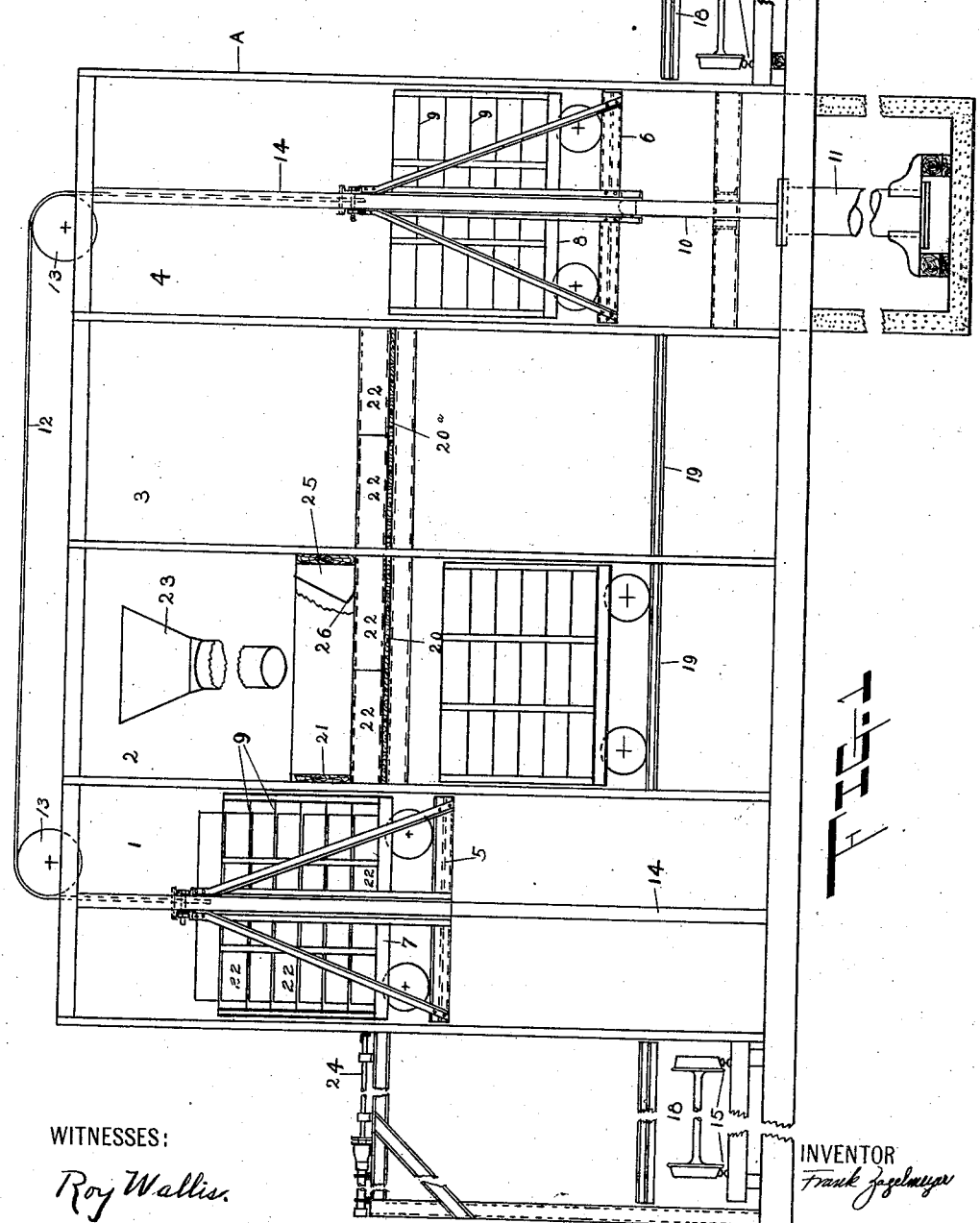
WITNESSES:
Roy Wallis.
Ralph S. Warfield.
INVENTOR
Frank Zagelmeyer
BY
Geo. B. Willcox
ATTORNEY No. 857,143. PATENTED JUNE 18, 1907.
F. ZAGELMEYER.
FILLING MECHANISM FOR BRICKMAKING PLANTS.
APPLICATION FILED JULY 30, 1906.
2 SHEETS—SHEET 2.
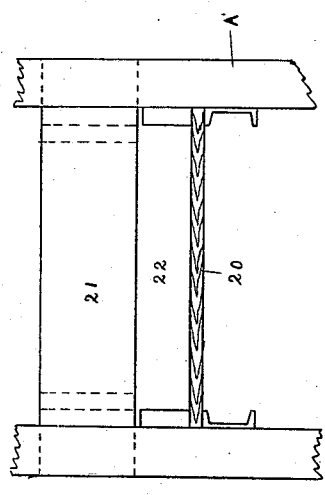
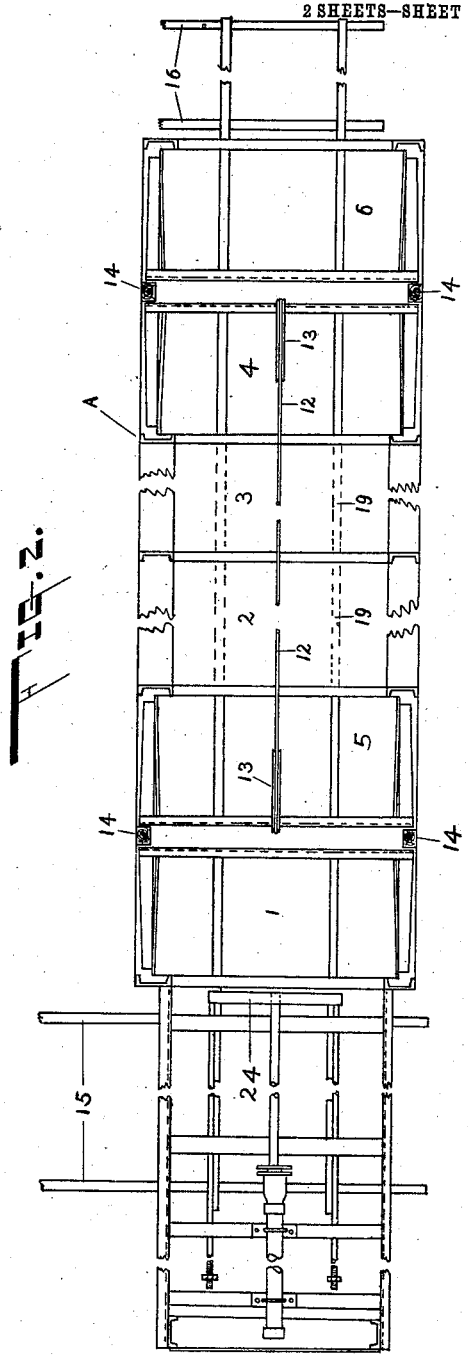
WITNESSES:
INVENTOR
Frank Zagelmeyer
BY
ATTORNEY

UNITED STATES PATENT OFFICE.

FRANK ZAGELMEYER, OF BAY CITY, MICHIGAN.

FILLING MECHANISM FOR BRICKMAKING PLANTS.

No. 857,143.  Specification of Letters Patent.  Patented June 18, 1907.

Application filed July 30, 1906. Serial No. 328,441.

*To all whom it may concern:*

Be it known that I, FRANK ZAGELMEYER, a citizen of the United States, residing at Bay City, in the county of Bay and State of Michigan, have invented certain new and useful Improvements in Filling Mechanism for Brickmaking Plants; and I do hereby declare the following to be a full, clear, and exact description of the invention, such as will enable others skilled in the art to which it appertains to make and use the same.

My invention relates to filling mechanisms for brick making plants, whereby the empty molds are successively filled with a creamy "wet mix."

The art of "casting" brick is comparatively new, so far as I am aware. There are a number of processes for manufacturing brick, but in all prior methods known to me, the material is compressed or subjected to pressure, while in the mold, to compact the material and press it into every corner of the mold, after which the brick may be subjected to heat or not, depending upon the composition of matter used.

The "wet mix" process so called, is far in advance of former methods, since it needs no kiln to bake the brick and no pressure to compact the material in the molds. Instead, a liquid cementitious mixture of about the consistency of heavy cream is prepared from the pit run of gravel preferably,—although other filling ingredients are quite as good,—and cement. This wet mix can be made at about the ratio of ten parts of filling material to one of binding material, although, of course, the ratio may be infinitely varied. This creamy wet mix is then poured into suitable frames or molds containing a number of cells. These molds are then allowed to stand until the material in the cells (which are each of the size and shape of a brick), has set, but not fully hardened, after which the molds are conveyed to an ejecting mechanism whereby the brick are ejected from the molds, the latter cleaned if necessary, and then returned to the filling mechanism to receive a new charge.

The prior art will disclose a series of molds supported between the rails of a track upon which track a traveling filling machine is adapted to operate filling the molds successively. After the molds are filled, they are allowed to stand until the material has set after which a traveling ejector may be brought to each mold in succession to eject the brick therefrom.

My invention is designed to provide a stationary filling mechanism, the molds being brought to the filling mechanism where they receive the creamy composition after which they are conveyed to a suitable place where the material is allowed to set.

Another object of my invention is the provision of means for conveying a number of empty molds to the filling mechanism at one time, the molds being fed in rapid succession thereto.

Another object is the provision of means for mechanically feeding the molds to the filling mechanism in a rapid and skilful manner without loss of time.

A further object is the provision of a single means for receiving a plurality of molds as they are filled one by one and conveying them to a suitable setting chamber.

A still further object is the provision of means whereby the empty and filled mold truck elevators are caused to operate synchronously.

A further object attained by my invention is the economy in space which is a desideratum in the commercial manufacture of brick.

My invention further consists in certain novel elements and combinations of parts together with their equivalents, such as will be more fully described hereinafter and particularly pointed out in the claims.

In the accompanying drawings, Figure 1 is a view in side elevation of a mechanism embodying my invention. Fig. 2 is a top plan view and Fig. 3 is a detail end view of the filling or slush box.

In carrying out this embodiment of my invention, I preferably provide a suitable frame work (A) divided into four sections (1), (2), (3), and (4). Sections (1) and (4) constitute elevator shafts in which the platform elevators (5) and (6) travel, said platform elevators being preferably provided with rails to receive the empty and filled mold trucks (7) and (8). Each of these trucks is provided with a series of shelves or decks (9) (9), say seven in all, adapted to receive the molds, and I preferably place two molds on each deck. Of course a larger or smaller number of molds can be carried by the trucks without departing from the spirit and scope of my invention.

The sections (1), (2), (3) and (4) are preferably in alinement with each other and elevator (6) may be connected to the piston (10) of a motor (11) whereby to positively raise and lower the elevator which elevator is connected by means of a flexible connection (12) passing over the sheaves (13) (13) with the elevator (5).

It is plainly obvious that any other hoisting means might be employed in place of the piston motor and that each elevator might have a separate hoisting mechanism, the motor shown being merely one of a number of different instrumentalities which might be used without departing from the spirit and scope of my invention. In the mechanism shown also, it will be seen that as the elevator (6) is raised, the elevator (5) will be lowered and vice versa, but it is well within the bounds of my invention to cause the elevators to move simultaneously in the same direction.

The elevators are preferably guided in their travel by means of the guides (14) (14). A track (15) extends close to the base of shaft (1), a similar track (16) extending to the base of shaft (4), transfer cars (18) being adapted to travel on the tracks to supply the filling mechanism with trucks of empty molds and convey the trucks of filled molds therefrom respectively.

A track (19) extends from the rear side of the section (3) to the opposite front side of section (2), the track (19) adapted to lie on a plane with and form a continuation of one or the other of the platform elevators (5) or (6) when in their lowered position, whereby to receive the empty mold trucks (7) from elevator (5) and permit them to be pushed onto the elevator (6) to take the place of the mold trucks carried by the last named elevator as they are filled and conveyed from the machine.

Above the track (19) a suitable distance, is located a stationary table or flooring (20) on which the empty molds are received from the truck on elevator (5), and at the approximate height of a mold above the flooring is situated an open-bottomed slush box (21), the molds (22) adapted to pass beneath this slush box to receive the creamy brick composition which is fed into the slush box from any suitable type of mixer (23).

The material may be intermittently fed into the slush box since the latter has neither top nor bottom, and unless the molds are in position beneath the box the material would fall upon the flooring (20).

In the form of mechanism shown in the drawings, this flooring is continued across the section (3), but it may be perfectly feasible to omit section (3) entirely and locate the elevator shaft section (4) in its place.

As one means for feeding the molds to the filling mechanism from the trucks (7), I provide a pusher (24) which reciprocates in a horizontal direction to push the empty molds off of the truck on elevator (5) onto the flooring or support (20), the forward ends of the empty molds engaging the molds just previously filled and pushing them onto the extension support ($20^a$) the latter molds taking the place of the molds on the support which are thereby pushed onto an empty deck of the truck carried by elevator (6). Of course, if section (3) is omitted, the filled molds from section (2) are pushed directly onto the elevator (6) by the movement of the empty molds.

The operation in brief is as follows: The trucks carrying the empty molds received from an ejecting mechanism, not shown, are conveyed by a transfer car (18) to the elevator (5) onto which they are rolled, the elevator being in its lowest position, the previously emptied truck being rolled off the elevator onto track (19). Elevator (6) is then approximately at its highest limit of movement and carries a truck of filled molds. The positions of the elevators are then reversed to permit the filled truck to be rolled off of elevator (6) onto a transfer car, the empty truck on track (19) being rolled onto the elevator (6). The motor (11) is now actuated to lower the elevator (5), simultaneously raising elevator (6) until the lowermost mold on elevator (5) is in position to be pushed onto the flooring support (20) beneath the slush box (21) at which time the uppermost empty deck of the truck on elevator (6) is opposite the mold support ($20^a$), ($20^a$), whereupon the motor is shut off and holds the elevators stationary while the pusher (24) is operated to shove the lower tier of empty molds off the lower deck of the truck on elevator (5) onto the mold support (20) beneath the slush box (21), the empty molds pushing the filled molds from beneath the slush box as previously explained and resulting in moving the filled molds onto the uppermost empty deck of the truck carried by elevator (6). As soon as this is accomplished, the motor again moves the elevator (5) down one step until the next lowest tier of empty molds is in position to be shoved onto the support (20), whereupon the foregoing operation is repeated, the elevator (5) being moved step by step downward as the elevator (6) is raised step by step, an operation of the pusher occurring at each interval until the truck on elevator (5) is empty, the elevator at that time being approximately in its lowest position and the truck on elevator (6) is full, the latter elevator being in its highest position. The empty truck is then rolled off elevator (5) onto the track (19), and a truck bearing further supply of empty molds is rolled onto the platform (5) from a transfer car (18). The positions of the elevators are then reversed, whereupon the filled truck is rolled from elevator (6) onto a transfer car (18), an empty truck being supplied to the elevator from the track (19) and the entire operation repeated. It is only during this transferring operation that the mixer need be prevented from feeding to the slush box, as at other times the molds follow each other in such rapid succession and without a break that the material is always caught therein, the molds being, of course, provided with bottoms or pallet boards.

It is essential that some means for wiping the molds be provided so that surplus material will not be carried on top of the molds out of the filling machine to which end I may provide the slush box (21) with a wiper or shoe (25) preferably upturned at one end, as at (26), the bottom surface of the wiper lying approximately even or upon the mold cells as they pass thereunder, whereby any surplus material is prevented from passing out of the box (21) and furthermore the surface of the material in the cells is left smooth. Of course any suitable form of wiper may be used to accomplish these or similar results.

It is plainly evident that I have devised a most simple mechanism for rapidly filling empty molds, and that many changes other than those hereinbefore mentioned, might be made without departing from the spirit and scope of my invention, and hence I do not wish to limit myself to the exact construction herein set forth.

Having thus fully disclosed my invention, what I claim as new is—

1. A filling mechanism comprising a plurality of elevators, a filling box interposed therebetween having a mold receiving space therebeneath, trucks adapted to support a plurality of molds in tiers, the trucks removably received on the elevators, means for conveying the trucks to and from the elevators, and a pusher arranged in alinement with the mold receiving space beneath the filling box, one of the elevators adapted to bring successive tiers of the truck loaded with empty molds into alinement with the pusher and filling box, the passage of the molds beneath the filling box adapted to crowd the previously placed molds onto the truck removably carried by the remaining elevator.

2. In a brick making apparatus, a filling mechanism, an empty mold elevator, means receivable on the elevator and supporting a plurality of molds, a filled mold elevator, means on such last named elevator for receiving a succession of filled molds, a flexible connection between the elevators, and means for positively actuating at least one elevator at will.

3. In a brick making machine, a filling mechanism, a truck carrying a plurality of empty molds, means for conveying the truck to the machine, an elevator adapted to receive the truck, means for raising the truck to the filling mechanism to present the empty molds successively thereto, means for feeding the empty molds to the filling mechanism, a second elevator, an empty truck carried thereby adapted to receive the molds as they are filled, means for conveying the filled mold truck from the machine and a way leading between the two elevators to receive the successive trucks when the empty molds have been removed therefrom.

4. A filling mechanism comprising a plurality of elevators, a filling box, having a mold receiving space therebeneath, one of the elevators adapted to carry a plurality of empty molds and a pusher arranged in alinement with the mold receiving space and adapted to engage the successive empty molds and push them beneath the filling box and toward the opposite elevator.

In testimony whereof, I affix my signature in presence of two witnesses.

FRANK ZAGELMEYER.

Witnesses:
RALPH S. WARFIELD,
A. A. EASTERLY.